(12) United States Patent
Pecho et al.

(10) Patent No.: US 6,485,085 B1
(45) Date of Patent: Nov. 26, 2002

(54) CONVERTIBLE TOP ARRANGEMENT

(75) Inventors: Walter Pecho, Ringelai (DE); Georg Kopp, Plattling (DE); Klaus Obendiek, Passau (DE)

(73) Assignee: Edscha Cabrio - Verdecksysteme GmbH, Hengersberg (DE)

( * ) Notice: Subject to any disclaimer, the term of this patent is extended or adjusted under 35 U.S.C. 154(b) by 0 days.

(21) Appl. No.: 09/648,890

(22) Filed: Aug. 25, 2000

(30) Foreign Application Priority Data

Aug. 27, 1999 (DE) .......................... 199 40 796

(51) Int. Cl.⁷ ................. B60J 1/18; B60J 7/12
(52) U.S. Cl. .............. 296/107.07; 296/146.14; 296/147
(58) Field of Search .................. 296/146.14, 147, 296/107.07

(56) References Cited

U.S. PATENT DOCUMENTS

| | | | |
|---|---|---|---|
| 3,236,557 A | * 2/1966 | Podolan | 296/146.14 X |
| 3,333,362 A | * 8/1967 | Kostin et al. | 296/146.14 X |
| 4,626,020 A | 12/1986 | Kaltz et al. | |
| 5,375,901 A | * 12/1994 | Agosta et al. | 296/146.14 |
| 6,123,381 A | * 9/2000 | Schenk | 296/146.14 X |
| 6,123,382 A | * 9/2000 | Lorenz | 296/146.14 |
| 6,149,223 A | * 11/2000 | Baessler et al. | 296/146.14 |
| 6,180,237 B1 | * 1/2001 | Kato et al. | 428/410 |

FOREIGN PATENT DOCUMENTS

| | | |
|---|---|---|
| DE | 4320603 | 12/1995 |
| DE | 19636209 | 12/1997 |
| DE | 19746569 | 5/1999 |
| DE | 19804101 | 8/1999 |

* cited by examiner

*Primary Examiner*—Dennis H. Pedder
(74) *Attorney, Agent, or Firm*—Davidson, Davidson & Kappel, LLC

(57) ABSTRACT

The invention relates to a convertible top arrangement for a vehicle, comprising a top mechanism, which actuates a convertible top and is arranged on a body of the vehicle, a rear window, which is designed to close an aperture in the convertible top when the top mechanism is closed, a rear-window mechanism arranged outside the top mechanism engaging on the rear window and on the body, the rear-window mechanism of the rear window being capable of being lowered outside the convertible top, thereby freeing the aperture, and raised against the convertible top, thereby closing the aperture, wherein the rear-window mechanism is designed as a double four-joint system that can be folded up in a Z shape.

29 Claims, 3 Drawing Sheets

CONVERTIBLE TOP ARRANGEMENT

FIELD OF THE INVENTION

The invention relates to a convertible top arrangement. More particularly, the invention relates to a convertible top arrangement of the type comprising a top mechanism, which actuates a convertible top and is arranged on a body of the vehicle, a rear window, which is designed to close an aperture in the convertible top when the top mechanism is closed, a rear-window mechanism arranged outside the top mechanism engaging on the rear window and on the body, the rear-window mechanism of the rear window being capable of being lowered outside the convertible top, thereby freeing the aperture, and raised against the convertible top, thereby closing the aperture.

DESCRIPTION OF THE PRIOR ART

Vehicles with cloth tops which allow windows made of plastic to be fitted into the top and removed are known in practice, although the top as such cannot be lowered. These removable windows are scratch-prone transparent plastic panels and fitting or removing them requires a considerable amount of work and, in particular, cannot be carried out while the vehicle is under way.

Also known in practice are all-terrain vehicles and transport vehicles in which the tail essentially forms a vertical end and the rear window is formed essentially vertical and flat, these vehicles allowing the window to be retracted in a guide rail within the paneled tail-flap structure in a manner similar to a side window. Although these known vehicles allow ventilation by means of the retractable rear window, it is not possible to apply this solution to a vehicle with a notch back or hatch back, especially a convertible.

Also known in practice are motor vehicles with a convertible top designed as a hard top, which can be folded as a whole and stowed in a holder arranged in the region of the C-post. However, it is not possible here to lower part of the top to ventilate the interior of the motor vehicle while at the same time retaining the remainder of the top.

It is furthermore known in practice, in addition to the top mechanism driving a pivoted folding top, to provide supporting arrangements for the rear window, which is, in particular, made of glass and inserted permanently into the pivoted top, to prevent sagging of the top due to the weight of the rear window and to stabilize the rear window. These supporting arrangements can only be released when the folding top is to be lowered and do not offer any possibility of ventilating the interior of the motor vehicle.

German laid open publication DE 36 07 650 A1 describes a convertible vehicle with a rear window which is enclosed in a frame, the frame together with the rear window closing the rear window opening in a raised position or opening it in a lowered position. The change in the position of the rear window is accomplished either by means of a handle or a worm/worm gear system, a pair of levers being attached at one end to an upper flange of the frame and at the other hand to a joint provided in a fixed manner on the body, and a second pair of levers being attached to a lower flange of the frame and to a mounting element. Basically, the pairs of levers define a four-joint system. With the flat window inserted, the frame performs a movement essentially along a circular radius and is deposited behind the driver's seat in an almost vertical deposition position. To achieve leaktight contact with the roof structure, the frame, which is what gives the rear window its actual stiffness, is provided with a bulky seal in the form of a strip, which is not provided in the region of the upper edge of the rear window. There is the risk that the window will gradually be displaced out of its position under its own weight and owing to vibrations which occur under way, without the handle being operated. In the case of a motor drive, a special brake should be provided for this purpose, further increasing the outlay for the retractable rear window. It should furthermore be noted that the lever projects at least partially into the passenger compartment and hence performs troublesome movements in the region of the driver's head and that, owing to the type of holder for the rear window, a structure of this kind can fundamentally only be considered for a two-seater convertible.

German patent DE 198 04 101 C1 describes a folding top for convertibles. With this folding top, a rear window rests by means of a frame surrounding the rear window on the outside of a convertible top, a flap provided on the outer frame being capable of assuming a position which deviates from the plane of the window and being pivotable about 90° to allow it to be swung behind the convertible top, parallel to the frame, and hence to hold the window together with the frame. The window is opened by pivoting the flap upward and swinging the window outward by about 135° by means of a piston/cylinder unit to allow the window to be deposited with its outer side lying flat underneath the luggage-compartment lid. For this purpose, the luggage-compartment lid must first of all be opened, more specifically about additional hinges provided at the rear, it being necessary for this purpose for the rear window to be of essentially flat design. This has the effect, in particular, that the rear window cannot be opened partially while under way.

German patent DE 197 53 209 C1 gives a theoretical description of a rear window that can be lowered, this rear window on the one hand being connected to the C-posts by connecting devices when closed and being capable of being lowered into the luggage compartment by means of joints. The joints can make up a four-joint system.

German patent DE 196 36 209 C1 describes a folding top for a convertible, in which a rear window made of glass or plastic is provided in the fabric of a rear top component which can be lowered into a top compartment with a lid independently of a front top component, the two independently movable top components being fixed relative to one another by means of a releasable locking arrangement which is not explained in greater detail. Since the two top components are cloth tops, it must be assumed that the linkage is locked by overcenter locking, where the internal stress in the top cloth ensures mutual locking.

German laid open publication DE 197 46 569 A1 describes a convertible top, the rear part of which is divided into a main frame part and a rear frame part, it being possible to swing the rear frame part down relative to the main frame part to allow space-saving arrangement in the luggage compartment. The main frame part includes the rear window. This document does not describe actuation of the rear frame part to open a window opening.

German patent DE 43 20 603 C2 describes a convertible in which a flat window that can be lowered by means of a handcrank or an electric motor is provided in the rear area, this window being capable of being lowered and raised on an extension of its flat plane. Together with the side parts, which can be pivoted down separately, and the roof component, the rear window defines the convertible top, the lowered rear window being stored outside the luggage compartment and there by entailing an increase in the overall length of the vehicle and furthermore having to be moved along a sealing surface of the side parts, the convertible having overall a cockpit which is not very attractive esthetically and falls away at a shallow angle.

SUMMARY OF THE INVENTION

It is the object of the invention to provide a convertible top arrangement which creates a flexible and space-saving means of ventilating the interior of a convertible vehicle.

It is a further object of the invention to provide a convertible top arrangement which allows a space-saving means to move and dispose a rear window of a convertible vehicle.

It is a still further object of the invention to provide a convertible top arrangement which allows to design a convertible vehicle top having a curved back.

The present invention relates to a convertible top arrangement. More particularly, the invention relates to a convertible top mechanism, which actuates a convertible top and is arranged on a body of the vehicle, a rear window, which is designed to close an aperture in the convertible top when the top mechanism is closed, a rear-window mechanism arranged separately from the top mechanism engaging on the rear window and on the body, the rear-window mechanism of the rear window being capable of being lowered separately from the convertible top, thereby freeing the aperture, and raised against the convertible top, thereby closing the aperture.

A first embodiment of the present invention provides a convertible top arrangement for a vehicle, comprising a convertible top mechanism, which actuates a convertible top and is arranged on a body of the vehicle, a rear window, which is designed to close an aperture in the convertible top when the top mechanism is closed, a rear-window mechanism arranged separately from the top mechanism engaging on the rear window and on the body, the rear window mechanism of the rear window being capable of being lowered separately from the convertible top, thereby freeing the aperture, and raised against the convertible top, thereby closing the aperture, wherein the rear-window mechanism is designed as a double four-joint system that can be folded up in a Z shape.

Another embodiment of the present invention a convertible top arrangement for a vehicle, comprising a top mechanism, which actuates a convertible top and is arranged on a body of the vehicle, a rear window, which is designed to close an aperture in the convertible top when the top mechanism is closed, a rear-window mechanism arranged separately from the top mechanism engaging on the rear window and on the body, the rear-window mechanism of the rear window being capable of being lowered separately from the convertible top, thereby freeing the aperture, and raised against the convertible top, thereby closing the aperture, wherein the rear-window mechanism engages the top mechanism with the rear window raised.

Another embodiment of the present invention provides a convertible top arrangement for a vehicle, comprising a top mechanism, which actuates a convertible top and is arranged on a body of the vehicle, a rear window, which is designed to close an aperture in the convertible top when the top mechanism is closed, a rear-window mechanism arranged separately from the top mechanism engaging on the rear window and on the body, the rear-window mechanism of the rear window being capable of being lowered separately from the convertible top, thereby freeing the aperture, and raised against the convertible top, thereby closing the aperture, wherein the rear window is made of curved single-layer safety glass.

Still another embodiment of the invention provides a convertible top arrangement for a vehicle, comprising a top mechanism, which actuates a convertible top and is arranged on a body of the vehicle, a rear window, which is designed to close an aperture in the convertible top when the top mechanism is closed, wherein the rear window is made of curved single-layer safety glass, a rear-window mechanism arranged outside the top mechanism engaging on the rear window and on the body, the rear-window mechanism arranged of the rear window being capable of being lowered separately from the convertible top, thereby freeing the aperture, and raised against the convertible top, thereby closing the aperture, wherein the rear-window mechanism is designed as a double four joint system that can be folded up in a Z shape, and wherein the rear-window mechanism engages the top mechanism with the rear window raised and the rear-window mechanism and the top mechanism enter into mutual form-locking engagement through projections and recesses which engage in one another in a form-locking manner.

According to the invention, the rear-window mechanism is designed as a double four-joint system that can be folded up in a Z shape, a window-side stop component having two joints for the pivotal connection of two links which, at their end pointing away from the window-side stop component, are connected pivotally to two further links, which form the diagonal arm of the Z. The two window-side links extend essentially parallel to or along the sides of the rear window and are pivoted by only a small amount relative to the latter. The intermediate links, for their part, are each connected pivotally to a link forming the foot of the Z. The preferred design of the rear-window mechanism makes it possible to provide the stop components for the rear window approximately in the middle and thus to limit the pivoting radius of the displacement. Moreover, the stop components for the rear window are provided in the border region of the latter, with the result that the associated links of the rear-window mechanism do not extend on the optical axis, defined by the rear-view mirror and the aperture, which could obstruct the driver's view. Moreover, the approximately central arrangement of the stop components for the rear window, one on the left and one on the right, allows very uniform distribution of pressures and forces over the, generally curved, area of the rear window.

The convertible top arrangement according to the invention makes it possible to release the rear window from the top and lower it independently of the latter and thus provide ventilation for the interior of the vehicle. This makes it possible to ventilate the interior of the vehicle without the need to open the entire top. In particular, it is possible to open and close the rear window while the motor vehicle is under way, something which is generally not possible for the top as a whole. This makes it possible, e.g. at high temperatures, when the interior is heated up particularly severely owing to the, generally dark, colors of the top and the poor thermal insulation, to achieve rapid removal of the warm air, which generally rises, via the opened rear window, especially if this is combined with opening a side window, without the need to open the entire top. This is advantageous particularly when the intention is to make journeys at high speed over relatively long distances, where the driver does not want to expose himself to the relative wind and the sun or where, for example, a shower could damage the interior fittings of the vehicle if the top were open. The convertible top arrangement according to the invention furthermore also makes it possible to insert long or bulky objects, which may protrude, or guide them through the aperture for the rear window since, in the case of vehicles with a convertible top, the storage space required for the folded-up top often prevents objects from being passed through the luggage compartment. Other objects too can be passed into the vehicle from the rear in this way.

Another advantage of the convertible top arrangement according to the invention is that the rear window can be stored in an optimum manner in the place of deposit, independently of the convertible top, thanks to its arrangement in a particular position in the stowage space, in particular due to the fact that the folded length of the convertible top no longer depends on the height of the rear window integrated into it but can be reduced to smaller formats. Moreover, when pressing the top in a corresponding place of deposit, there is no need to consider the risk of breaking or scratching the rear window. Replacement of the rear window, which is otherwise integrated into the top, is also made easier in the event of breakage or damage.

Moreover, in addition, the convertible top arrangement according to the invention provides advantageous support for the window when raised, thereby eliminating vibration of the rearward part of the top, which otherwise carries the window, and improving visibility to the rear, in particular via an interior rear-view mirror. It is self-evident that visibility to the rear is likewise unimpaired with the window lowered. The possibility of lowering the rear window and the convertible top separately and independently of one another furthermore creates an opportunity to provide a larger rear window than was hitherto necessary owing to the matter of stowage, thereby allowing visibility to the rear to be further improved. The weight imposed on the convertible top and its associated tendency to sag is also reduced in an effective manner, thereby allowing the use of top fabrics in the rearward region of the top which are thinner and hence less expensive to produce.

Another advantage of the convertible top arrangement according to the invention is that it is possible to provide ventilation for the interior of the vehicle while imposing on the driver of the vehicle significantly less driving noise and, furthermore, less severe drafts since the rear window is at a sufficiently large distance from the front seats, in particular, in the interior of the vehicle. In the case of a folding top, the material of the top can moreover be made with approximately the same thickness in the region of the aperture for the rear window as the remainder of the top, thereby making possible a further reduction in space when the top is lowered as a "package".

A rear-window mechanism arranged outside the top mechanism ensures that, in a first, raised end position, the rear window closes the aperture in the convertible top and brings the rear window into contact with the convertible top in such a way that the contact between the two components is, to a first approximation, airtight and, in all cases, rainproof. In the second, lowered end position, in which the aperture is open, the rear window is completely outside the region of the aperture and also outside the angle of vision of a rear-view mirror in the vehicle interior and thus allows unobstructed visibility to the rear without partially closing the aperture. In the lowered open position, the rear window is in an end position in which it does not touch the closed top and permits free actuation of the top. It is expediently possible to halt the rear window at any desired position along its path of displacement from the first end position to the second end position and back, as with a side window, in order to vary, with respect to the cross section of flow exposed, the air gap created by opening the aperture in the convertible top by pivoting the rear window away. However, it is also possible, as an alternative, to provide just two end positions and to eliminate the possibility of halting the rear-window mechanism in an intermediate position, in which the rear window might be exposed without protection to loads that would result in breakage or scratching. It is furthermore possible to provide a rear window for a convertible which, in terms of its dimensions, corresponds completely or substantially to the rear window of a vehicle with a fixed structure, so that the overall styling of the vehicle is not lost as a result.

With the rear window closed, i.e. raised, the rear-window mechanism preferably changes the top mechanism and, in particular, means are provided for locking the rear-window mechanism relative to the top mechanism, e.g. a device which engages in a form-locking manner and by which the rear window is fixed locally- at least in one direction—relative to the top and its aperture in such a way that the formation of a gap due to shock-induced movements while under way or due to other causes is eliminated in an effective manner. Moreover, the locking system can interact with the top mechanism in such a way that unintentional release of the rear-window mechanism, e.g. after depressurization of the hydraulic actuating cylinder or due to the rear window's own weight, is prevented by the fact that the so-called fifth hoop (tensioning hoop) of the top must first be raised slightly in order to release the rear-window mechanism from its positive engagement with the top mechanism. When opening the rear window, it would then admittedly be necessary first of all to release the top at the rearward, fifth, hoop while, for the closure of the window, the locking system could be of the snap-action type to ensure reliable and tensioned latching-in of the rear window and moreover advantageously to indicate this fact by means of a snap sound.

However, it is advantageous if the form-locking engagement between the rear-window mechanism and the top mechanism defines only a supporting abutment which acts essentially normal to the aperture and along the partially open exit path of which the top mechanism can thus slide out again with initial guidance as the rear window is lowered.

In a snap-action development which is possible as an alternative, the snap fit for the rear window would be released automatically as the top was lowered, so that in the case where the top is retracted, the usual steps involved in retracting the top would be modified in that, after the release of a (releasable) fifth hoop, the rear window would be released from the top by the rear-window mechanism and lowered into the position in which it opens the aperture, while the top as such would simultaneously be lowered. In this case, it is possible to arrange the package comprising the top above the lowered rear window in such a way that the latter, for its part, can be raised only when the top has been raised again. The process of retracting the rear window while lowering the top is expediently synchronized using a hydraulic control system but it is also possible to provide this constraint by mechanical coupling of the top mechanism and the rear-window mechanism, it always being possible to actuate the rear-window mechanism independently of the top mechanism to lower the rear window with the top raised.

It is expedient if the top mechanism can be actuated to open or close the convertible top only with the rear window lowered, i.e. if the convertible top can only be completely raised or lowered if the rear window is first moved into the lowered end position or is lowered into this position during this process. This is an expedient way of ensuring that the rear window arranged in the region of the aperture in the top is not damaged while the top is being lowered.

The rear window preferably comprises curved single-layer safety glass. Although it is likewise possible to provide a rear window made of plastic or uncurved glass, the convertible top arrangement allows the provision of a rear window with a spherical shape and transverse bending in a correspondingly shaped aperture in the top, which rear window can then no longer be moved in a linear guide parallel to the top but is opened by pivoting. In contrast to plastic, single-layer safety glass is very scratch-resistant and can also help to give the impression of a vehicle with high-spec equipment, e.g. by tinting or some other adaptation to the design of the vehicle body. Moreover, the intrinsic weight of a rear window made of single-layer safety glass can be supported reliably by means of the rear-window mechanism and can be countenanced without imposing additional weight on the top, even in the case of a relatively large rear window. As a result, there is no weight-induced bending of the top material and, in addition, the spherically curved rear window is especially suitable for transmitting force over its entire edge to the border material surrounding the aperture in the top. It is expedient if the rear window made of single-layer safety glass has an enamel component, which is printed on and burnt in and is designed in a known manner as a decorative print or conductor track. The decorative print, in particular the decorative print provided as a border, allows the lamination of the stop components for the rear window which are arranged on the inside. The conductor tracks on the rear window are optionally designed as antenna wire for a radio arranged in the interior or as heating wires for a rear-window heating system. It is not readily possible to achieve both functions with plastic windows. When conductor tracks are arranged on a surface of the rear window, e.g. either for radio reception or for a heated rear window, operation of these requires the ability for control via contacts. For this purpose, the contacts must follow the displacement of the rear window into the deposition region outside the aperture in the top and this requires either a long contact wire, which is, for example, seated on a spring-loaded spool in a manner which allows it to be wound up, or, preferably, a sliding contact, which establishes contact only when the rear window is in its raised position. As an alternative, it is possible to provide for the contacting of the conductor tracks of the rear window along the rear-window mechanism by using wires laid along the links of the latter, although these would admittedly have a certain length. In this case, the contact wires are routed outside the moving parts of the rear-window mechanism to prevent mutual interference.

It is fundamentally possible to connect the stop components of the rear-window mechanism to the rear window by using a screwed joint, it being necessary to produce corresponding holes with high precision in the rear window before bending the glass. Especially in the case of slotted holes for compensating tolerances and preventing stresses that endanger the rear window, cutting slotted holes may require sand-blast cutting of the window, this being associated with a considerable outlay. It is expedient if the stop component is not arranged directly on the window using holes through the latter but is connected to it using a rear-window frame which is preferably molded on and is, for example, composed of a plastic. This eliminates holes in the glass and, indeed, the stop component can, for example, be introduced during the encapsulation process itself, if appropriate together with electrical contacts. It is expedient if the encapsulating material is a foamed, curing plastic, such as polyurethane or PVC, which can be colored black using colored pigments, for example. The frame resting against the outside of the rear window expediently comes up against the border of the aperture in the top, it being possible for the two components to be given a matching shape and, in particular, also to have further means of, for example force-locking, retention, e.g. touch-and-close fasteners or the like. In particular, it is possible for the two components to define a seal using projecting ribs and depressions in the manner of an interengaging labyrinth. As an alternative to encapsulation or screwed joints, there is also the possibility of bonding the stop component to the glass using a correspondingly shaped surface and a coating provided for this purpose if appropriate. Suitable adhesives for this purpose are, for example, those which are provided for the purpose of bonding the foot of the rear-view mirror to the windshield. The frame is expediently constructed from a slightly flexible material to enable relatively small tolerance deviations or play to be compensated and is furthermore preferably molded on in such a way that, when the rear window is mounted on, self-centering bedding in on the top takes place.

One advantage of complete enclosure of the periphery of the rear window, by encapsulation for example, is that when machining the edge of the glass it is not necessary to achieve a fully cylindrical grinding profile, which would otherwise have to be provided to avoid cuts in protruding portions or flanks that have not been cleanly ground.

It is expedient if the rear-window mechanism can be controlled by a hydraulically actuable piston/cylinder unit, so that the command to open the rear window issued by the push of a button by the driver of the vehicle, for example, leads to a movement of the rear-window mechanism due to the hydraulic actuation of the piston/cylinder unit. Hydraulic actuation is advantageous, in particular because the lever ratios for a pivoting movement in which that side of the rear window which faces the interior of the vehicle is pivoted in the direction of the interior but also away to the rear can be achieved only with difficult using an electric drive. In principle, however, manual actuation by means of an actuating lever extending as far as the driver is also possible.

It is expedient to provide a control system which, on the basis of the position of the hydraulic piston/cylinder unit, reliably detects the pivoting travel of the rear window, e.g. using contact detectors or the like and, on this basis, controls the top mechanism or other moving parts or indicators of the vehicle. In particular, the control system can trigger the actuation of the rear window mechanism when the top mechanism as a whole is actuated and the rear window should be released from the top for this purpose. It is expedient to provide a separate contact detector for each joint arrangement of the rear-window mechanism.

It is possible to make the top fabric the same thickness in the region of the edge of the aperture as the remainder of the top fabric. However, it is expedient to reinforce the top material in the region of the edge of the aperture and, in particular, in the region of contact of the rear window or its border, it being possible for a reinforcement to comprise an applied plastic border or a sewn-in reinforcement. This ensures that, with the rear window lowered for example, the top is not torn or deformed by physical action.

According to a preferred development, it is possible to provide a check to indicate whether the displacement path of the rear window is free of obstructive material either placed in the displacement path or material piled on the lowered window. For this purpose, it is possible, on the one hand, to provide an optical measuring device which monitors the optical path of the movement of the rear window from its lowered position to its raised position and delivers a fault signal if the optical path is obstructed by objects or to provide a pressure or resistance sensor which delivers a warning signal during the movement of the rear window if there is increased resistance due, for example, to an increased weight of the window or due to an obstructing object which is inhibiting further movement.

Further advantages and features of the invention will become apparent from the following description and from the subclaims.

The invention will be explained in greater detail below by means of a preferred exemplary embodiment, with reference to the attached drawings.

DETAILED DESCRITPTION OF A PREFERRED EMBODIMENT

Figure 1:
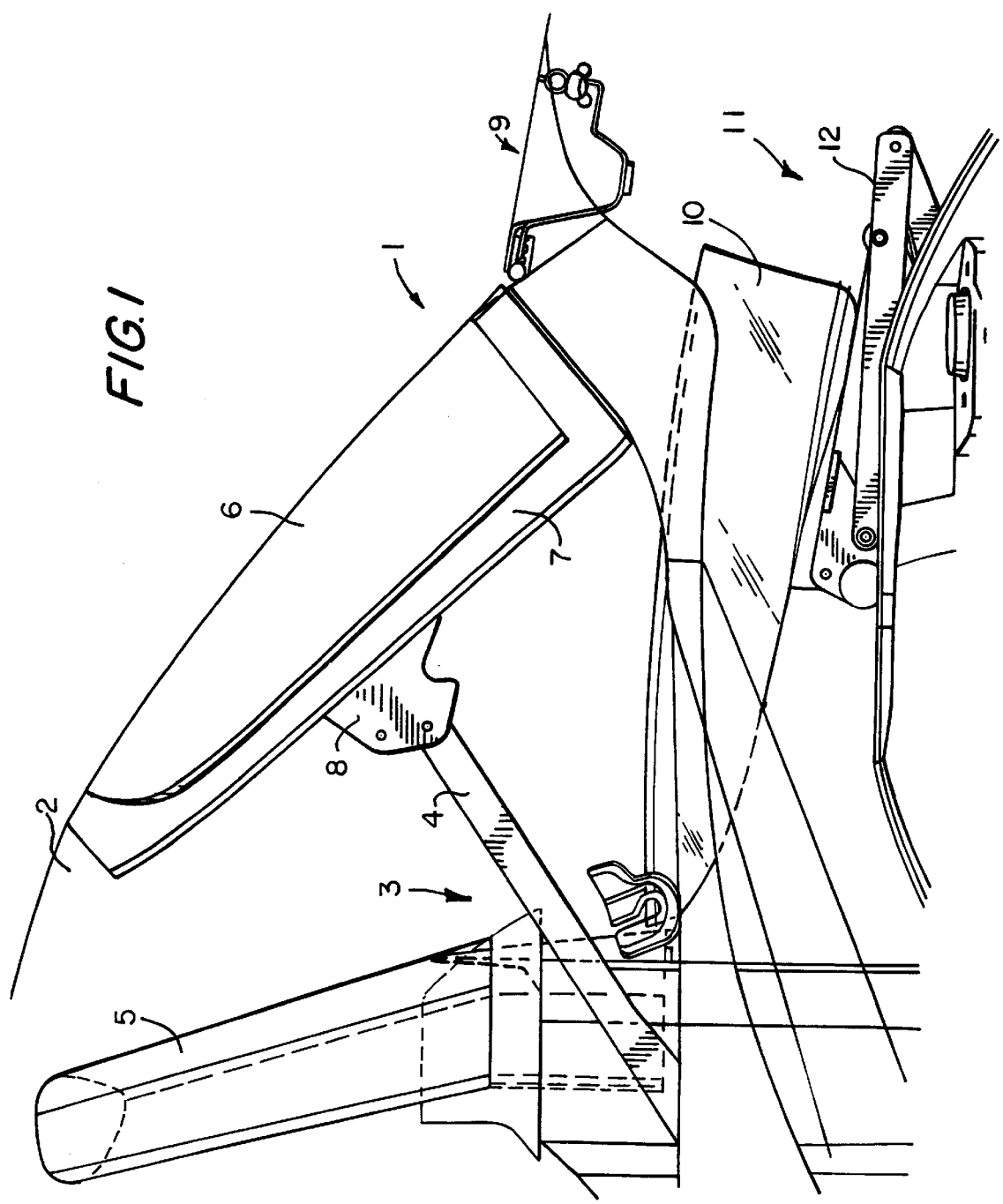
FIG. 1 shows a side view of a preferred exemplary embodiment of a convertible top arrangement according to the invention.
Figure 2:
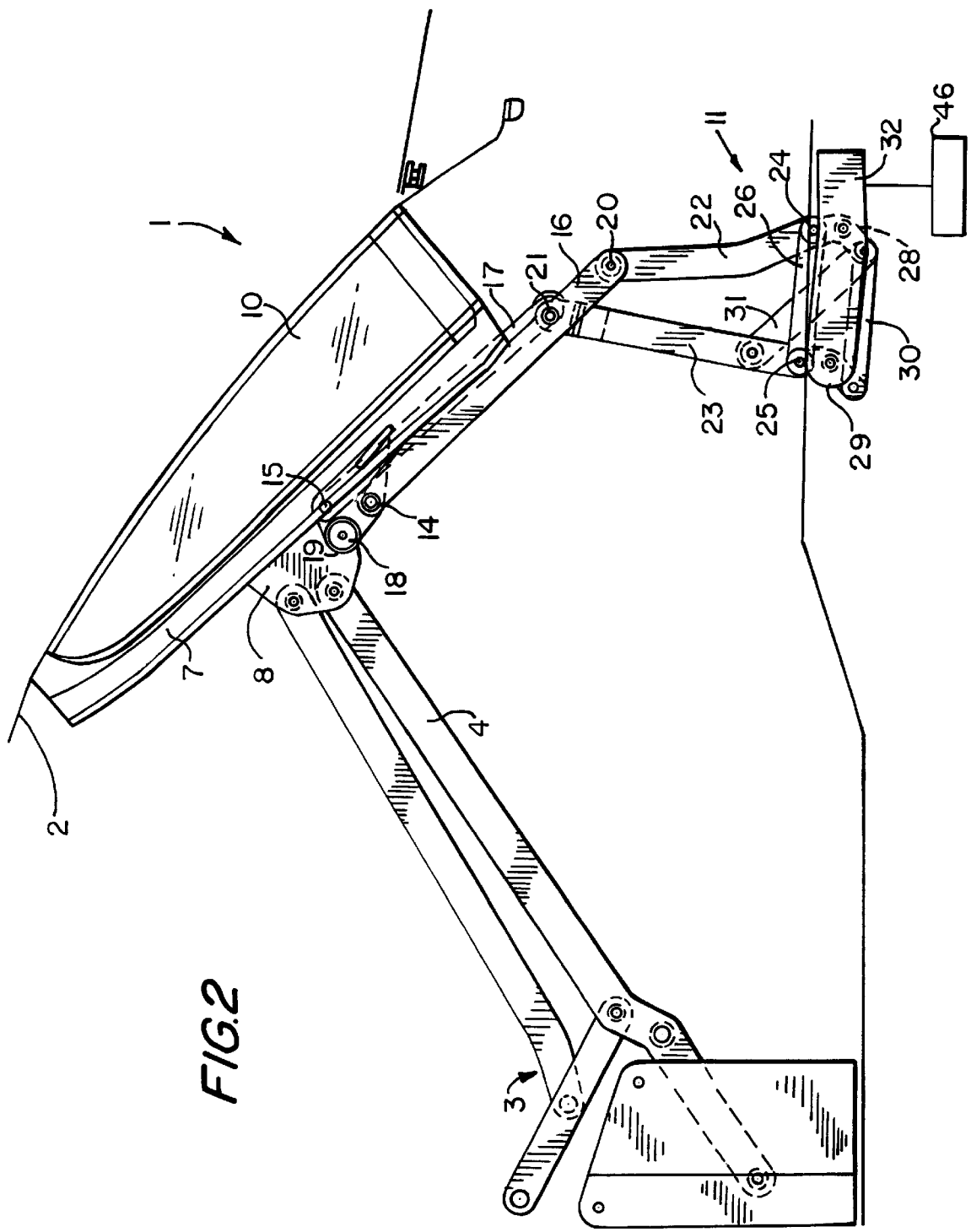
FIG. 2 shows parts of the convertible top arrangement from FIG. 1 with the rear window raised.
Figure 3:
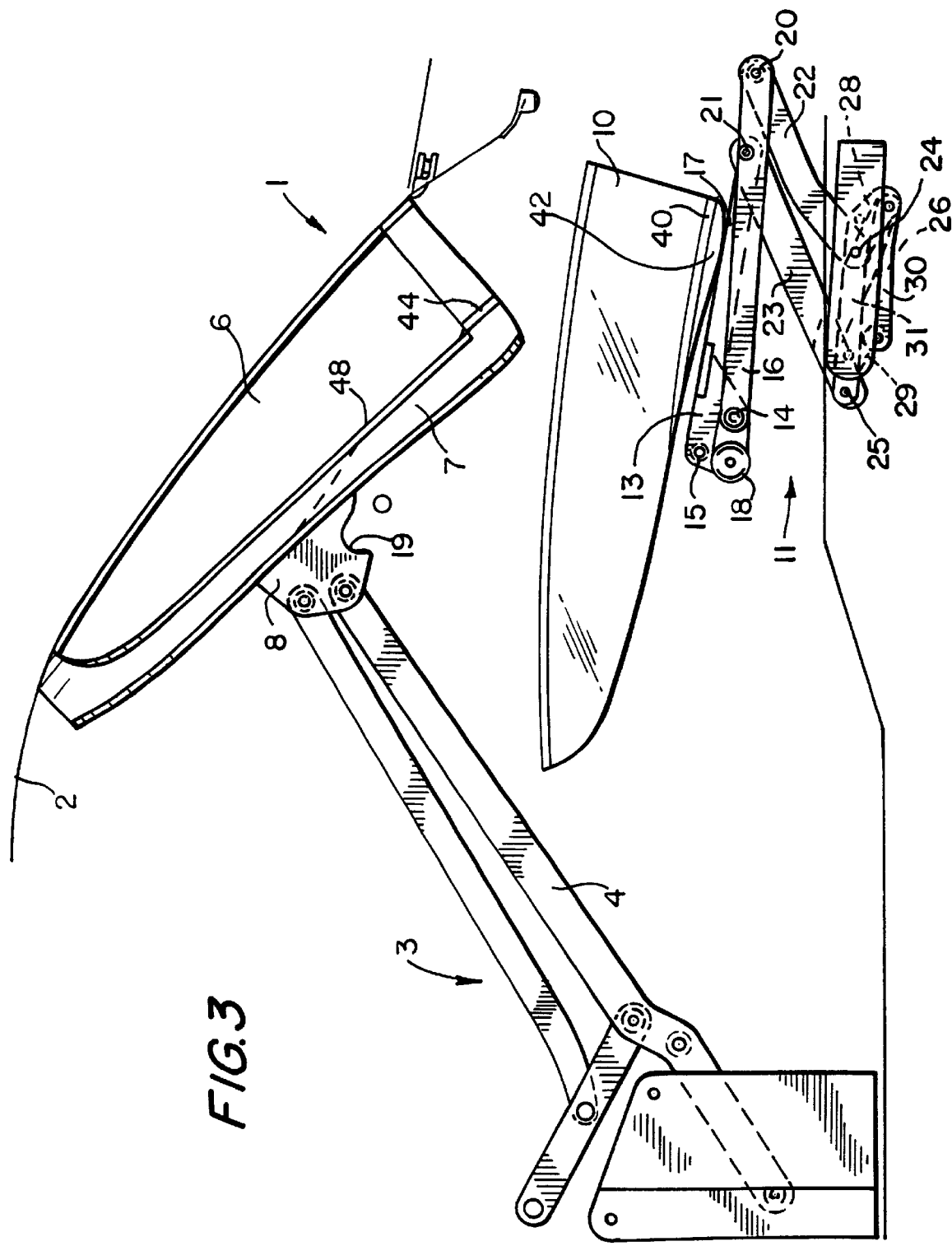
FIG. 3 shows the convertible top arrangement from FIGS. 1 and 2 with the rear window lowered.

The convertible top arrangement shown in FIGS. 1 to 3 is denoted in a general way by the reference 1 and, in the view shown, arranges a top 2 of a motor vehicle in a raised position on the motor vehicle. The convertible top 2 comprises various linkage components 4 belonging to the top mechanism 3, a number of which are not shown. 5 indicates a bow of the top mechanism 3. Provided in the rearward region of the top 2 is an aperture 6, which has the approximate shape of a rear window and the peripheral border 7 of which has a reinforcement for the top material. An attachment 8 of the linkage 4 also engages on the border 7. As a rearward extension of the border 7 of the aperture 6, a cover 9 covers an opening through which the top 2 and the top mechanism 3 can be lowered. FIG. 1 shows a rear window 10 made of curved and, if required, tinted single-layer safety glass in the lowered position, thereby opening the aperture 6 in the top 2. The rear window 10 is held approximately in the middle of the lateral boundaries of the rear window 10 by two joint arrangements 12, which are attached to the body, form the rear-window mechanism 11 and will be described in greater detail below. Since this is a side view, only the front one of the two joint arrangements 12 is shown.

The parts of the convertible top arrangement 1 which are under consideration here are shown more clearly in larger detail views free from any additional auxiliary mechanism in FIG. 2 and 3. In the illustration in FIG. 2, the rear window 10 has been brought up against the border 7 of the aperture 6 of the top 2, thereby closing the aperture 6. It can be seen that a border region of the rear window 10 is supported against the border 7 and, together with the latter, forms a leaktight seal against penetration by rainwater or the like. It is apparent that the linkage components 4 of the top mechanism 3 which stretch the rearward region of the top 2 over the attachment 8 are additionally stabilized in their shape and position by the preloading provided by the rear window 10. The rear window 10 is held by stop components 13 of the rear-window mechanism 11, through which it is connected via a molded-on plastic border. As an alternative, it is possible to make the connection by means of screwing, adhesive bonding or some other suitable means.

The stop components 13 have two joints 14 and 15 respectively, to which a first link 16 and a second link 17 respectively are pivotally connected.

The stop component 13 furthermore has a projecting region 18, which can be constructed as a roller or as a nose or projection if desired and enters into engagement with a recess 19 of corresponding mating design in the attachment of the top mechanism 3 in the manner of a guide. However, it is also possible to make the form-locking engagement of the snap or latching type. With the rear window 10 raised, the aperture 19 simultaneously forms an abutment for loads on the rear window in the closing direction, this abutment coupling the top mechanism and the rear-window mechanism to one another and preventing relative motion between the top 2 and the rear window 10. This ensures that the leaktight seating of the rear window 10 on the border 7 is not compromised by a gap or play.

The first link 16 is coupled to a third link 22 by a joint 20 provided on its end that points away from the stop component 13, and the second link 17 is coupled to a fourth link 23 by a joint 21 provided on its end that points away from the stop component 13. At their ends pointing away from the joints 21 and 22 respectively, the third link 22 and the fourth link 23 are connected to one another by a crosstie 26 arranged on the joints 24 and 25 provided at those points, there engaging on the joints 24 and 25 two short links 28 and 29 respectively which, for their part, are connected pivotally to a component 30 fixed to the body. A control link 31 is connected pivotally at both ends to the fourth link 23 and the component 30 fixed to the body and controls the four-joint system formed by the components 22, 23, 26 and the links which are arranged on the stop component 13 and having joints 20, 21, 24 and 25. With the links 16 and 17 arranged on the stop component 13, this thus gives a double four-joint system.

As a contribution to more favorable force transmission by both short links 28, 29, a connecting rod 32, which is coupled to a piston/cylinder unit (not shown) and allows a hydraulic motion to be converted into the motion of the rear-window mechanism 11 in a known manner, is connected. It will be apparent from a comparison between FIG. 2 and 3 that with the connecting rod 32 drawn in, that is to say moved to the rear, the short links 28 and 29 are moved into an almost upright position while, with the connecting rod 32 extended, as in FIG. 3, the short links 28, 29, which are of curved design, are moved into a position pivoted by about 50° relative to this. It will furthermore be apparent from a comparison between FIG. 2 and 3 that the first link 16 and the second link 17 perform only a minimal pivoting motion on their joints 14 and 15 so that it will therefore be possible, as an alternative, to make the attachment of the two components rigid. However, the joint arrangement, at 14, 15 makes it possible to compensate for play between the various components, and stresses, which could be transmitted to the material of the rear window, are advantageously avoided.

It will be apparent from FIG. 3 that, with the rear window 10 lowered, the rear-window mechanism 11 folds up in the manner of a Z, the first and second links 16, 17 and the short links 28, 29 forming the horizontal arms of the Z and the third and fourth links 22, 23 forming the diagonal arm of the Z in schematic representation. The side view shows only one joint arrangement 12 with the associated linkage of the rear-window mechanism 11, but it is self-evident that there is an identical joint arrangement 12 for the same purpose provided on the other side of the rear window 10. However, it is also possible to arrange the rear-window mechanism 11 on one side only, but this makes it more difficult to take up bending due to the intrinsic weight of the rear window, for which reason such a solution will only be considered in the case of lightweight materials such as plastic or the like or when latching means on the other side provide secure retention.

The invention operates as follows:

Starting from the lowered position of the rear window 10, as illustrated in FIG. 3, the convertible top 2 can be lowered or raised again by operating the top mechanism 3 in a known manner, e.g. through a hydraulic auxiliary drive. It will be apparent that the rear window 10 is not required for the purpose of raising or lowering the top 2; on the contrary, it will in fact be possible to fold the top 2 more advantageously and retracted more quickly since it will not be necessary to take account for this purpose of the rear window 10, which is sensitive and has a complex geometry. When the convertible top 2 is raised, the linkage 4 of the top mechanism 3 ensures that the top material is stretched in the region of the aperture 6, in particular of the preferably preshaped border 7, thus retaining the design and appearance of the vehicle body even with the rear window 10 lowered, as shown in FIG. 3. When the convertible top 2 is completely raised, the rear window can be pivoted rearward from the position shown in FIG. 3 into its other end position, shown in FIG. 2, by moving the connecting rod 32, in which position the rear window 10 comes into contact with the inner border 7 of the convertible top 2 and thus closes the aperture 6. For this purpose, as already described above, the projection 18 on the stop component 13 slides into the recess 19 in the attachment 8, arranged on the top, of the top mechanism 3 and thus locks the rear window 10 against relative motion normal to the top 2.

In the exemplary embodiment under consideration, it is not necessary for the movement into the end position shown in FIG. 2 that the top 2 tensioned by the fifth hoop (tensioning hoop, not shown) should be briefly released to allow the stop component 13 to be pivoted into the position in which it is shown. As a result, the rear window 10 can be opened and closed even while under way. For this purpose, the rear-window mechanism 11 has a pivoting curve which initially has the rear window 10 in the vicinity of the top 2 in an extension of the raised position and then describes a movement which takes place principally along the aperture 6, which is thereby gradually closed. On the one hand, this advantageously allows the projection 18 to be moved along a guiding flank of the recess 19. At the same time this pivoting travel has the advantage that the slight opening of the—curved—rear window 10 opens up a narrow gap without moving the rear window into a position at an angle to the optical axis in which the optical properties of the glass would distort the view to the rear. It is thus possible to ventilate the interior of the vehicle while under way even by opening the rear window 10 by a small amount.

However, it is also possible to arrange the convertible top arrangement 1 in such a way that the rear window 10 can only be opened after raising a tensioning hoop, e.g. a rear tensioning hoop, through the connecting rod 32 moving the short links 28 and 29 into an over-end position, in which the stop component 13 has to pivot past the attachment 8 and the latter must therefore be pulled slightly. It is likewise necessary when releasing the engagement between the projection 18 and the recess 19 first of all to slacken the top at the rear in order then to be able to pivot the rear-window mechanism in the direction of exposure of the aperture 6 and lowering of the rear window 10.

It will be apparent that the linkage components of the top mechanism 3 and of the rear-window mechanism 11 engage in the top 2 outside the aperture 6, thus avoiding obstruction of the view to the rear by linkage components. It will furthermore be apparent that, in its lowered position, as illustrated in FIG. 3, the rear window 10 is also outside the field the view of the driver when lowered and, as a result, the view to the rear is not impaired with the rear window 10 lowered either. This is important because the optical transmission properties of glass depend inter alia on the angle at which the rear window is set and, in particular, because in the more sharply curved areas more severe refraction by the glass can lead to a distorted representation of the objects seen behind the vehicle in comparison with perfect optics.

Owing to the interengagement of the top mechanism 3 and the rear window mechanism 11 in the raised state of the rear window, it is advantageous to lower the rear window 10 separately before lowering the top 2. It is expedient if, for this purpose, a control system for the top mechanism ensures that the rear window 10 is lowered automatically before or while the top 2 is lowered so that the process of lowering the top is distinguished by a step in which the rear window 10, with the rear-window mechanism 11 arranged on it, is first of all to be moved out of the raised position toward its lowered end position before the top 2 is lowered.

As shown in FIG. 3, rear window 10 has an enamel component 40 which may have a conductor track that interacts with a sliding contact 44 in a raised state. Stop 13 can be fixed to a plastic molding frame 42 of the rear window 10. As shown in FIG. 3, border 7 has a reinforcement 48 adapted for contacting the external contour of the rear window. As shown in FIG. 2, control system 46 can control piston rod 32 to actuate the rear-window mechanism 11 as a function of the actuation of the top mechanism 3.

The invention has been described above by means of a preferred exemplary embodiment with a rear window made of curved single-layer safety glass. It is self-evident that any type of rear window can be raised and lowered in the same way and that the invention can, in principle, also be provided for the purpose of pivoting vehicle windows other than the rear window.

What is claimed is:

1. A convertible top arrangement for a vehicle, comprising
   a top mechanism, which actuates a convertible top and is arranged on a body of the vehicle,
   a rear window, which is designed to close an aperture in the convertible top when the top when mechanism is closed,
   a rear-window mechanism arranged separately from the top mechanism and connected to the rear window and to the body,
   the rear-window mechanism of the rear window being capable of being lowered separately from the convertible top, thereby freeing the aperture, and raised against the convertible top, thereby closing the aperture,
   wherein the rear-window mechanism is designed as a double four-joint system that can be folded up in a Z shape.

2. The convertible top arrangement as claimed in claim 1, wherein the rear window is capable during a last movement of a displacement along the aperture to be closed.

3. The convertible top arrangement as claimed in claim 1, wherein the rear-window mechanism engages the top mechanism with the rear window raised.

4. The convertible top arrangement as claimed in claim 3, wherein the top mechanism is fixed when the rear window is raised.

5. The convertible top arrangement as claimed in claim 1, wherein the rear window can be lowered essentially with its interior face downward.

6. The convertible top arrangement as claimed in claim 1, wherein the rear window is made of curved single-layer safety glass.

7. The convertible top arrangement as claimed in claim 6, wherein the rear window is provided with an enamel component, which is printed on and burnt in and comprises one of a conductor track and a decorative print.

8. The convertible top arrangement as claimed in claim 7, wherein a conductor track can be activated through a sliding contact in the raised state.

9. The convertible top arrangement as claimed in claim 1, wherein the rear window includes a frame fixed to stop components of the rear-window mechanism.

10. The convertible top arrangement as claim in claim 9, wherein the frame is a plastic molding molded onto the rear window.

11. The convertible top arrangement as claimed in claim 1, wherein the rear-window mechanism can be controlled a hydraulically actuable piston arrangement.

12. The convertible top arrangement as claimed in claim 1, wherein the rear-window mechanism engages outside the aperture on boundaries of the rear window which are at a side in an installed position.

13. The convertible top arrangement as claimed in claim 1, wherein the rear-window mechanism comprises links which are connected pivotally to a stop component arranged on the rear window and are arranged predominantly along an edge of the rear window.

14. The convertible top arrangement as claimed in claim 1, further comprising a control system controlling the actuation of the rear-window mechanism as a function of the actuation of the top mechanism.

15. The convertible top arrangement as claimed in claim 1, wherein a border of the aperture of the convertible top comprises a reinforcement being adapted to one of an external contour of the rear window and of a frame which at least partially surrounds the rear window.

16. The convertible top arrangement as claimed in claim 1, wherein, with the rear window raised, the rear-window mechanism and the top mechanism enter into mutual form-locking engagement through projections and recesses which engage in one another in a form-locking manner.

17. The convertible top arrangement as claimed in claim 1, wherein a four-joint system connected by two links is set up between a component fixed to the body and short links arranged pivotably thereon, on the one hand, and one of rigid links and jointed links starting from the rear window.

18. A convertible top arrangement for a vehicle, comprising
  a top mechanism, which actuates a convertible top and is arranged on a body of the vehicle,
  a rear window, which is designed to close an aperture in the convertible top when the top mechanism is closed,
  a rear-window mechanism arranged separately from the top mechanism and connected to the rear window and to the body,
  the rear-window mechanism of the rear window being capable of being lowered from the convertible top, thereby freeing the aperture, and raised against the convertible top, thereby closing the aperture,
  wherein the rear-window mechanism abuttingly engages a rigid part of the top mechanism such that the rear window is urged against the convertible top with the rear window raised.

19. The convertible top arrangement as claimed in claim 18, wherein wherein the rear-window mechanism is designed as a double four-joint system that can be folded up in a Z shape.

20. The convertible top arrangement as claimed in claim 18, wherein the top mechanism is fixed when the rear window is raised.

21. The convertible top arrangement as claimed in claim 18, wherein the rear window is made of curved single-layer safety glass.

22. The convertible top arrangement as claimed in claim 18, wherein the rear window includes a frame fixed to stop components of the rear-window mechanism.

23. The convertible top arrangement as claimed in claim 18, wherein the rear-window mechanism is actuated by an arrangement comprising a piston and a cylinder.

24. The convertible top arrangement as claimed in claim 18, wherein the rear-window mechanism comprises links which are connected pivotally to a stop component arranged on the rear window and are arranged predominantly along an edge of the rear window.

25. The convertible top arrangement as claimed in claim 18, further comprising a control system controlling the actuation of the rear-window mechanism as a function of the actuation of the top mechanism.

26. The convertible top arrangement as recited in claim 18, wherein the rigid part of the top mechanism is an attachment of the top mechanism to the convertible top in a vicinity of the aperture, the rear-window mechanism including a stop component connected to the rear window, and the attachment and the stop component engaging in a form locking manner with the rear window raised.

27. The convertible top arrangement as claimed in claim 18, wherein a four-joint system connected by two links is set up between a component fixed to the body and short links arranged pivotably thereon, on the one hand, and one of rigid links and jointed links starting from the rear window.

28. A convertible top arrangement for a vehicle, comprising
  a top mechanism, which actuates a convertible top and is arranged on a body of the vehicle,
  a rear window, which is designed to close an aperture in the convertible top when the top mechanism is closed,
  a rear-window mechanism arranged separately from the top mechanism and connected to the rear window and to the body,
  the rear-window mechanism of the rear window being capable of being lowered from the convertible top, thereby freeing the aperture, and raised against the convertible top, thereby closing the aperture,
  wherein the rear window is made of curved single-layer safety glass and wherein a four-joint system connected by two links is set up between a component fixed to the body and short links arranged pivotally theron, on the one hand, and of rigid links and jointed links starting form the rear window, and wherein the rear-window mechanism comprises links which are connected pivotally to a stop component arranged on the rear window and are arranged predominantly along an edge of the rear window.

29. A convertible top arrangement for a vehicle, comprising
  a top mechanism, which actuates a convertible top and is arranged on a body of the vehicle,
  a rear window, which is designed to close an aperture in the convertible top when the top mechanism is closed,
  wherein the rear window is made of curved single-layer safety glass, a rear-window mechanism arranged separately from the top mechanism engaging on the rear window and on the body, the rear-window mechanism arranged of the rear window being capable of being lowered from the convertible top, thereby freeing the aperture, and raised against the convertible top, thereby closing the aperture, wherein the rear-window mechanism is designed as a double four-joint system that can be folded up in a Z shape, and wherein the rear-window mechanism engages the top mechanism with the rear window raised and the rear-window mechanism and the top mechanism enter into mutual form-locking engagement through projections and recesses which engage in one another in a form-locking manner.

* * * * *